United States Patent

Labbaye et al.

[15] 3,675,079
[45] July 4, 1972

[54] THREE PHASE ELECTRIC SWITCHING SYSTEM HAVING RECTIFIER SHUNTED CONTACTS

[72] Inventors: Louis Labbaye, Grenoble; Georges Bernard, Saint Egreve, both of France

[73] Assignee: Merlin Gerin, Societe Anonyme, Grenoble, France

[22] Filed: June 28, 1971

[21] Appl. No.: 157,464

[30] Foreign Application Priority Data

July 15, 1970 France ................................. 7026086

[52] U.S. Cl. ........................... 317/11 A, 307/133, 317/11 E, 317/33 SC
[51] Int. Cl. ......................................................... H02h 7/22
[58] Field of Search ........................... 317/11 A, 11 E, 33 SC; 307/133, 136

[56] References Cited

UNITED STATES PATENTS

| 1,982,875 | 12/1934 | Koppitz | 317/11 A |
| 2,782,345 | 2/1957 | Kesselring | 317/11 A |
| 3,293,496 | 12/1966 | Induni | 317/11 E |

*Primary Examiner*—James D. Trammell
*Attorney*—Stevens, Davis, Miller & Mosher

[57] ABSTRACT

A medium or high voltage three phase electric switching system comprising in each phase a pair of separable contacts shunted by a plurality of serially connected rectifiers. A special connection of the rectifiers of the different phases and a gated trigger circuit permit to select the number of serially connected rectifiers of two of the phases corresponding to only a fraction of the circuit interphase reverse restriking voltage.

6 Claims, 1 Drawing Figure

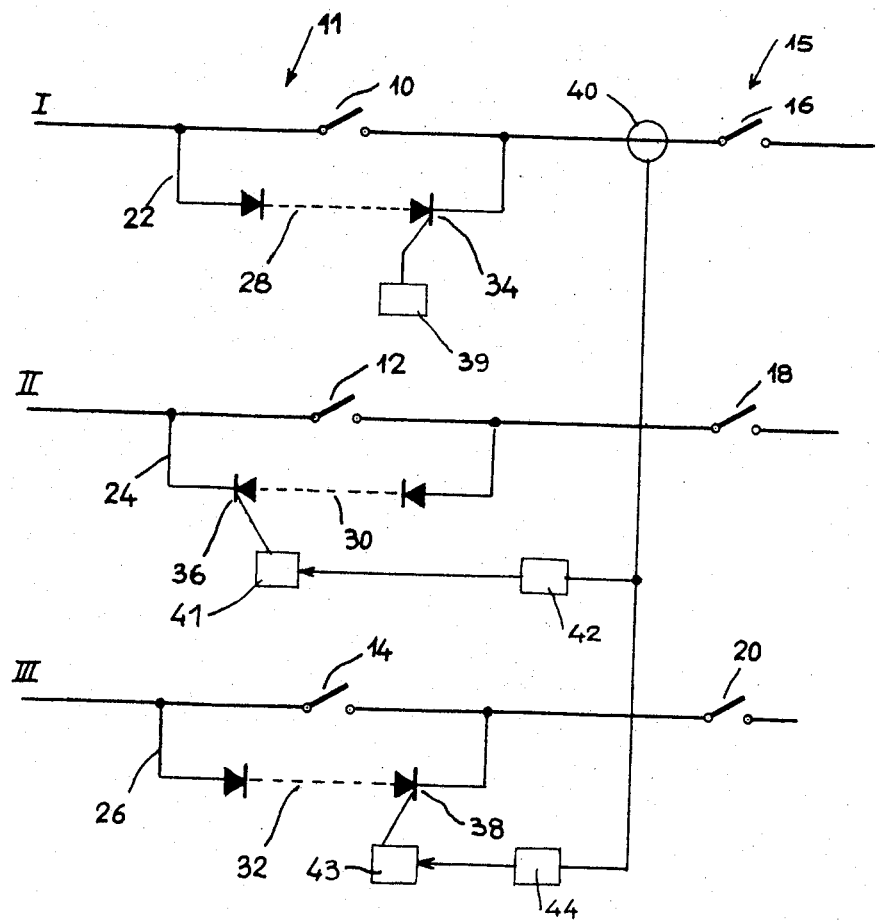

THREE PHASE ELECTRIC SWITCHING SYSTEM HAVING RECTIFIER SHUNTED CONTACTS

This invention relates to a three phase electric switching system and more particularly to a switching system comprising in each phase a pair of separable contacts, a plurality of equally poled serially connected rectifiers connected in parallel to the pair of contacts, and trigger means responsive to the instantaneous value of the current flowing in said phase to switch the current to said plurality of rectifiers thereby permitting the contacts upon the separation thereof to interrupt the current pursuant to a fault appearing in said circuit.

Systems of this kind are described in the copending application No. 101,272, filed Dec. 24, 1970.

In the systems of the prior art, the number of serially connected rectifiers is selected for each phase to withstand the full interphase restriking voltage of the circuit, said number being equal for all phases and determined by the peak reverse voltage of the rectifiers.

It is an object of the invention to reduce the total number of rectifiers of a switching system of the kind mentioned to reduce their cost-price, or to diminish, at least, the voltage stress of a part of the rectifiers.

According to a feature of the invention, the serially connection of the rectifiers of one phase is oriented in a direction opposite to that of the other phases (with respect to the load), whereby means are provided to interrupt the current, after occurring of a fault in the circuit, firstly in one of said other phases before the rectifiers in both remaining phases become operative so that, after interruption of the current in said remaining phases all rectifiers of both said phases are connected in series to withstand the applied restriking voltage. This fact permits to reduce the number of the rectifiers in said last name phases.

Other advantages and characteristics of the invention will become evident from the following description of one embodiment of the invention given by way of example which is shown in the accompanying drawing, the sole FIGURE of which shows diagrammatically the electrical circuit of the installation.

In the FIGURE, a three phase circuit interrupter 11 has three poles 10, 12 and 14, each inserted in one of the phases I, II and III, respectively of a supply circuit for a load (not shown but to be imagined connected to the lines on the right-hand side of the figure). A second three phase circuit interrupter 15 having poles 16, 18 and 20 connected downstream of and in series with the poles 10, 12 and 14 is associated with the circuit interrupter 11, the opening of the two circuit interrupters 11 and 15 preferably taking place simultaneously under the action of any suitable device, in case of appearence of a fault current in the circuit. The contacts of each pole 10, 12 and 14 of the circuit interrupter 11 are shunted by circuits 22, 24 and 26, respectively in which there are arranged in series a plurality of equally poled semiconductors rectifier elements, such as diodes 28, 30 and 32, respectively, one of wich being a controlled semiconductor rectifier, such as a thyristor 34, 36 and 38, respectively.

A trigger device for each phase, diagrammatically shown in 39, 41, 43, respectively, controls the thyristors 34, 36 and 38 by applying suitable pulses to their gates so as to fire them after the opening of the associated contacts 10, 12, 14, respectively, and shortly before the passage of the current through the zero point for a period of the time sufficient for the extinguishing of the arc produced in the different poles in a manner described in the aforementioned patent application, to which reference may be had for fuller details, particularly with respect to the operation of this trigger device.

In accordance with the invention, the rectifier or semiconductor elements 30, 36 are reversed in one of the phases, for instance phase II, so as to be oriented in direction opposite the elements 28, 34 and 32, 38 of phases I and III. In case of a short circuit between phases I and II, the columns of diodes 28 and 30 are connected in series with the inter-phase voltage and each column of diodes therefore withstands only the half the voltage. It can easily be seen that a defect between phases II and III produces the same effect and that the diodes 30 of phase II are never subjected to a voltage of more than half the interphase voltage.

To provide for the sequential firing of the thyristors 34, 36 and 38, a detector, for instance a current transformer 40, is associated with phase I so as to supply a blocking order for the thyristors 36 and 38 of phases II and III, as long as a current flows in phase I. The sensing device 40 may be of any type, for instance a Hall-effect detector or an optical detector sensing the presence of an arc at the contacts 10 of the circuit interrupter and the output signal delivered controls gating devices 42 and 44 of the thyristors 36 and 38, respectively, in a manner known per se so as to prevent any conduction of the latter due to trigger circuits 41, 43 before the interruption of the current in phase I.

In the case of a short-circuit between phases I and III, with diodes oriented in the same direction, phase I is then necessarily opened first and the diodes 28 of said phase I are subjected to the full interphase restriking voltage V. the diodes of phase III, on the other hand, need no longer withstand this voltage V in this case. In the case of a three phase short-circuit, the gating circuits 42, 44 of the thyristors 36 and 38 forces phase I to open the circuit first of all so that rectifiers 28, 34 have to support the restriking voltage V alone. After the interruption of phase I, the fault continues between phases II and III and it is eliminated in the manner described above by imposing a maximum reverse restriking voltage of (V/2), on the diode columns 30, 32.

It follows from the above that only the diode column 28 of the unfavored phase I has to be designed to withstand the full reverse striking voltage V of the network ; whereby the stressing of the other columns can be poorer, the maximum voltage applied to each of the diode columns 30 and 32 is (V/2), but in the event that the neutral is grounded this voltage may reach a value of $(V)/(\sqrt{3})$ in case of defective grounding. A substantial saving of diodes results in both cases from the arrangement in accordance with the invention.

The transmitting of the inhibition signals takes place in any suitable manner, for instance electrically, optically or in another manner. For instance, gating circuits 42 and 44 can be provided by a simple photo resistor shunting the gate terminals of thyristors 36 and 38 and exposed to an arc between contacts 10, to short-circuit the output of trigger devices 41 and 43 as long as an arc is present across contact 10.

In the embodiment described, the contacts 10, 12 and 14 are random opened but the invention can also be utilized in an embodiment without controlled rectifiers but having sequentially opened contacts, the sequential opening being operated by current sensitive trigger circuits connected in each phase and which open the corresponding phase contacts as soon as, after occurrence of a fault current, the phase fault current is the proper half-cycle and / or of the proper instantaneous value. To obtain the advantages of the invention, it suffices to trigger the contacts 10 first in all cases, transferring the phase I current (if any) to the series connected non controlled rectifiers 28. After dying out of the current, said current sensitive trigger devices of phases II and III, which were blocked untill then, are enabled and trigger the contacts 12 and 14 at the suitable point in the current cycle.

What is claimed is:

1. In an electric switching system for a three phase circuit comprising in each phase a pair of separable contacts, a plurality of equally poled serially connected rectifiers connected in parallel to said pair of contacts, and trigger means responsive to the instantaneous value of the current flowing in said phase to switch said current to said plurality of rectifiers thereby permitting said contacts upon the separation thereof to interrupt said current pursuant to a fault appearing in said current, the improvement of said rectifiers of a first and a second phase being connected to pass current in a direction opposite to the direction in which the rectifiers of the third pass current, said trigger means of said second and said third phase being gated by gate means enabled by the absence of current flow in said first phase.

2. A system according to claim 1, said plurality of serially connected rectifiers of said first phase being selected to withstand the full reverse interphase restriking voltage of said circuit, said plurality of serially connected rectifiers of at least one of said second and said third phase being selected to withstand individually only a fraction of said full reverse restriking voltage.

3 In an electric switching system for a three phase circuit comprising in each phase a pair of separable contact, a plurality of equally poled serially connected rectifiers connected in parallel to said pair of contacts, said plurality comprising at least a controlled rectifier, and trigger means responsive to the current flowing in said phase to gate ON at a predetermined point of the current cycle said controlled rectifier after opening of said contacts pursuant to the appearance of a fault in said circuit, to transfer said current to said plurality of rectifiers, the combination of said rectifiers of a first and a second phase being connected to pass current in a direction opposite to the direction in which the rectifiers of the third phase pass current, said trigger means of said second and said third phase comprising gate means, said first phase comprising current sensing means to enable said gate means in the absence of current flow in said first phase.

4. The system according to claim 3, the number of serially connected rectifiers of said first phase being selected so that said plurality of said rectifiers of said first phase is rated to withstand the full reverse restriking voltage of said circuit, the number of serially connected rectifiers of at least one of said second and said third phase being selected so that plurality of the corresponding rectifiers is rated to withstand individually only a fraction of said reverse restriking voltage.

5. The system according to claim 4, for a circuit having a grounded neutral, said fraction being substantially equal to $(1/\sqrt{3})$.

6. The system according to claim 4, for a circuit having a floating neutral, said fraction being substantially equal to one-half.

* * * * *